United States Patent [19]

Hosoya et al.

[11] Patent Number: 5,144,929
[45] Date of Patent: * Sep. 8, 1992

[54] KNOCK SUPPRESSION APPARATUS AND METHOD FOR A MULTI-CYLINDER INTERNAL COMBUSITON ENGINE

[75] Inventors: Yasuhiko Hosoya; Toshio Iwata, both of Himeji, Japan

[73] Assignee: Mitsubishi Denki Kabushiki Kaisha, Tokyo, Japan

[*] Notice: The portion of the term of this patent subsequent to Aug. 13, 2008 has been disclaimed.

[21] Appl. No.: 731,246

[22] Filed: Jul. 17, 1991

[30] Foreign Application Priority Data

Oct. 2, 1990 [JP] Japan .................................. 2-263044

[51] Int. Cl.$^5$ ................................................ F02P 5/14
[52] U.S. Cl. ...................................................... 123/425
[58] Field of Search ............................... 123/425, 435; 364/431.08

[56] References Cited

U.S. PATENT DOCUMENTS

| | | | |
|---|---|---|---|
| 4,378,771 | 4/1983 | Sawada et al. | 123/425 |
| 4,499,877 | 2/1985 | Iwata | 123/425 |
| 4,512,309 | 4/1985 | Tansuwan | 123/425 |
| 4,766,545 | 8/1988 | Nagai | 364/431.08 |
| 4,821,194 | 4/1989 | Kawamura | 123/425 X |
| 4,895,121 | 1/1990 | McCoy et al. | 123/425 |
| 4,969,441 | 11/1990 | Komurasaki et al. | 123/425 |
| 5,038,735 | 8/1991 | Hosoya et al. | 123/425 |
| 5,054,448 | 10/1991 | Matsuoka et al. | 123/425 |

Primary Examiner—Willis R. Wolfe
Attorney, Agent, or Firm—sughrue, Mion, Zinn, Macpeak and Seas

[57] ABSTRACT

A knock suppression apparatus and method for a multi-cylinder internal combustion engine can perform knock determination for each cylinder, and selectively prevent such knock suppression control from being reflected or performed on a cylinder for which knock determination is determined to be erroneous due to the influences of noise, thereby avoiding resultant reduction in the engine control efficiency. A plurality of knock sensors are provided each of which senses vibrations of a corresponding cylinder to generate a corresponding output signal. A knock determiner generates a knock determining signal if it is determined, based on the output signals of the knock sensors, that there is knocking in a cylinder. A controller controls engine operating parameters in a direction to suppress knocking in the cylinder based on the knock determining signal. A noise determiner determines whether the knock determining signal for each cylinder is erroneous due to noise, and generates a noise determining signal if the knock determining signal is erroneous. A knock control inhibiter inhibits knock suppression control based on the knock determining signal on a cylinder for which a noise determining signal is generated.

12 Claims, 4 Drawing Sheets

KNOCK SUPPRESSION APPARATUS AND METHOD FOR A MULTI-CYLINDER INTERNAL COMBUSITON ENGINE

BACKGROUND OF THE INVENTION

The present invention relates to a knock suppression apparatus and method for a multi-cylinder internal combustion engine which can detect knocking in each of the engine cylinders and control engine operating parameters in a direction to suppress the knocking therein. More particularly, it relates to a knock suppression apparatus and method which can selectively prevent such knock suppression control from being reflected or performed on a cylinder for which knock determination is determined to be erroneous due to the influences of noise.

In general, internal combustion engines such as automotive gasoline engines have a plurality of cylinders for which ignition timing, the order of fuel injection, etc, are required to be properly controlled in accordance with the engine operating conditions such as the engine load for the purpose of generating output torque in an effective manner. To this end, the ignition timing for example is controlled to advance as the engine rotational speed increases, but if it is advanced to an excessive extent, premature or abnormal vibrations known as knocking due to abnormal combustion will result, giving rise a fear that the engine may be thereby damaged. In order to prevent, such an undesirable situation, when abnormal vibrations of the engine are detected upon ignition, it is general practice to control engine operating parameters in a direction to suppress the knocking, for example, to retard ignition timing in accordance with the engine vibrations.

FIG. 4 shows a typical known knock suppression apparatus for an internal combustion engine. The apparatus includes a knock sensor 1 in the form of a piezoelectric element and the like installed on the engine for sensing knocking therein, e.g., for sensing vibrations of the engine due to knocking and generating a corresponding electrical output signal A.

An interface circuit, generally designated by reference numeral 2, receives the output signal A from the knock sensor 1 and generates a peak level P and an average level A* during each ignition cycle. The interface circuit 2 includes a band-pass filter 21 for allowing the passage of a specific frequency band (e.g., around 7 KHz) attributable to knocking, a peak-hold circuit 22 for holding the peak level P of the output signal A from the filter 21 at a prescribed reference crank position for each cylinder which corresponds to the ignition timing thereof, and an averaging circuit 23 for averaging the output signal A from the filter 21 and generating a corresponding average level A*.

A first A/D converter 31 converts the peak level P in analog form from the peak-hold circuit 22 into a digital value $V_P$. A second A/D converter 32 converts the average level A* in analog form from the averaging circuit 23 into a digital value $V_A$.

An electronic control unit 4 (hereinafter simply referred to as an ECU), generally designated by reference numeral 4, controls the ignition timing or instant for a cylinder based on the A/D converted peak level $V_P$ and the A/D converted average level $V_A$, and generates a mask singal M to the peak-hold circuit 22. The ECU 4 includes a peak threshold calculator 41 for amplifying the digitized average level $V_A$ and adding an offset value to it to provide a threshold level or a peak threshold $V_{TH}$, a substracter 42 for making a comparison between the peak level $V_P$ and the peak threshold $V_{TH}$ to provide a deviation level $\Delta V$, and a retard angle controller 43 for generating a retarded control angle $\theta_R$ for ignition retarding control based on the deviation level $\Delta V$.

The retard angle controller 43 comprises a retard angle calculator 44 for calculating an amount or angle of retardation $\Delta \theta_R$ for each ignition on the basis of the deviation level $\Delta V$, and a retard angle adder 45 for successively summing the amount or angle of retardation $\Delta \theta_R$ thus obtained to successively provide a retarded ignition angle $\theta_R$.

The subtracter 42 acts to generate a deviation level in the form of a knock determination signal $\Delta V$ based on the peak level $V_P$ corresponding to the output signal A from the knock sensor 1. Also, the retard angle controller 43 acts to control engine operating parameters in a direction to suppress knocking on the basis of the deviation level or the knock determination signal $\Delta V$.

Here, it to be noted that the mask signal M contains a series of square pulses, which are generated by the ECU 4 at prescribed intervals, i.e., at a prescribed reference crank position of each cylinder during the rotation of the engine. Thus, for example, each square pulse rises at a first reference crank position of 75 degrees before top dead center (BTDC) for each cylinder and falls at a second reference crank position of 5 degrees BTDC, as clearly shown at M in FIG. 2. Accordingly, the peak-hold circuit 22 is disabled by the mask signal M in an angular range from the first reference crank position (e.g., 75 degrees BTDC) to the second reference crank position (e.g., 5 degrees BTDC) whereas it is enabled to hold the peak level P during a time from the second reference crank angle to the first reference crank angle.

The operation of the above-mentioned known knock suppression apparatus will now be described in detail.

In general, each cylinder is ignited at a reference crank position of about 5 degrees before TDC, so explosive combustion of a mixture therein takes place at around a crank angle position ranging from 10 to 60 degrees after TDC. As a result, knocking due to abnormal combustion would generally occur at such a crank angle position (around 10–60 degrees after TDC). Accordingly, if knocking takes place in a cylinder, the output signal A from the knock sensor 1 will have a wave form whose amplitude periodically becomes the greatest at around 10–60 degrees after each TDC, as clearly seen from FIG. 2.

The filter 21 in the interface circuit 2 allows the passage of a knock component contained in the output signal A from the knock sensor 1, which results from vibrations of a cylinder due to knócking. The peak-hold circuit 22 outputs a peak level of each output signal A. The averaging circuit 23 generates an average level A* corresponding to a background level of the output signal A. The ECU 4 generates a mask signal M to the peak-hold circuit 22 so that it can receive the peak wave of the knock sensor output A in an effective manner.

The ECU 4 receives the analog-to-digital converted peak level $V_P$ and the average level $V_A$ of which the latter is then properly amplified by the threshold calculator 41 and offset added to the background level of the knock sensor output A to provide a peak threshold $V_{TH}$ as a knock detection reference.

The subtracter 42 determines the occurrence of knocking if the peak level $V_P$ exceeds the peak threshold $V_{TH}$, and outputs a deviation level $\Delta V$ ($\Delta V = V_P - V_{TH}$) as a high level to the retard angle controller 43.

The retard angle calculator 44 in the retard angle controller 43 calculates an amount or angle of retardation $\Delta\theta_R$ for each ignition required for knock suppression based on the deviation level $\Delta V$. Based on the amount of retardation $\Delta\theta_R$, the retard angle adder 45 ouputs a retarded control angle $\theta_R$ in order to retard an ignition instant in a direction to suppress knocking. In this connection, the retarded control angle $\theta_R$ is expressed as follows:

$$\theta_R = \theta_R^* + \Delta\theta_R$$

where $\theta_R^*$ is the last retarded control angle. With this, an ignition instant of a cylinder to be controlled is modified in an ignition retarding direction so that there will no longer be any knocking in the cylinder.

In this case, however, cylinders are subject to various physical vibrations during the operation thereof, and thus the output signal A from the knock sensor 1 usually contains resultant noise. For example, intake and exhaust valves in each cylinder are properly driven to open and close in an alternative manner so as to supply an air/fuel mixture to a cylinder, compress the mixture therein, exhaust combusted gases generated after explosion, and the like, so that impactive forces developed upon opening and closing of these valves at the time of ignition will sometimes cause vibration of a cylinder, which can be mistakenly sensed as knocking by a knock sensor 1. Generally, such cylinder vibrations due to noise continue for a certain period of time. In addition, even if the level of vibrations due to noise is less than that due to knocking, it can exceed the peak threshold $V_{TH}$.

In this case, if ignition retarding control is performed based on an incorrect determination that noise is mistaken as knocking, an ignition instant is cumulatively controlled in an ignition retarding direction each time knocking is mistakenly sensed, thus greatly impairing cylinder control efficiency. In particular, provided that a knock sensor 1 is mounted on one cylinder alone, incorrect knock detection results in degradation in the overall control efficiency for all the cylinders, giving rise to a big problem from the point of view of effective engine control.

Thus, with the known knock suppression apparatus and method as described above in which an ignition instant of each cylinder is controlled in an ignition retarding direction on the basis of the result of a comparison between the peak level $V_P$ and the peak threshold $V_{TH}$, it is unable to perform accurate knock determination in cases where the knock sensor output A contains a noise component which is greater than the peak threshold $V_{TH}$. In this case, the noise component is mistakenly detected as knocking, so the ignition instant is continuously controlled to retard, thus considerably reducing engine control efficiency.

SUMMARY OF THE INVENTION

Accordingly, the present invention is intended to overcome the above-described problems encountered with the known knock suppression apparatus and method.

An object of the invention is to provide a novel and improved knock control apparatus and method for a multi-cylinder internal combustion engine which can perform knock determination for each cylinder, and prevent erroneous knock determination on a cylinder from being reflected on the overall engine control, thereby avoiding resultant reduction in the engine control efficiency.

In order achieve the above object, according to one aspect of the invention, there is provided a knock control apparatus for a multi-cylinder internal combustion engine comprising:

knock sensor means for sensing vibrations of cylinders to generate a corresponding output signal;

a knock determiner for generating a knock determining signal if it is determined, based on the output signal of the knock sensors, that there is knocking in a cylinder;

a controller for controlling engine operating parameters in a direction to suppress knocking in the cylinder based on the knock determining signal;

a noise determiner for determining whether the knock determining signal for each cylinder is erroneous due to noise, and for generating a noise determining signal if the knock determining signal is erroneous; and a knock control inhibiter for inhibiting knock suppression control based on the knock determining signal on a cylinder for which a noise determining signal is generated.

Preferably, the knock control inhibiter includes a plurality of first counters each counting noise determining signals for a corresponding cylinder, and inhibits ignition retarding control on a cylinder for which more than a first predetermined number of noise determining signals are generated.

Preferably, the knock control inhibiter further includes a plurality of second counters each counting the number of ignitions of a corresponding cylinder. The knock control inhibiter operates to clear a second counter for a cylinder each time a noise determining signal for the cylinder is generated, and clear a first counter for the cylinder if the number of ignitions of the cylinder is more than a second predetermined value at the time when the number of noise determining signals generated for the cylinder exceeds a first predetermined value.

Preferably, the knock control inhibiter includes a plurality of third counters each counting the number of ignitions of a corresponding cylinder. The knock control inhibiter operates to inhibit ignition retarding control on a cylinder for which the number of noise determining signals generated within a predetermined number of ignitions of the cylinder exceeds a predetermined value.

According to another aspect of the invention, there is provided a knock suppression method for a multi-cylinder internal combustion engine comprising the steps of:

sensing vibrations of cylinders to generate a corresponding knock sensor output signal;

generating a knock determining signal if it is determined, based on the knock sensor output signal, that there is knocking in a cylinder;

controlling engine operating parameters in a direction to suppress knocking in the cylinder based on the knock determining signal;

determining whether the knock determining signal for the cylinder is erroneous due to noise;

generating a noise determining signal if the knock determining signal is erroneous; and inhibiting knock suppression control based on the knock determining signal on a cylinder for which a noise determining signal is generated.

According to a further aspect of the invention, there is provided a knock control method for a multi-cylinder internal combustion engine comprising the steps of:

sensing vibrations of cylinders to generate a corresponding knock sensor output signal;

determining, based on the knock sensor output signal, whether there is a knocking in a cylinder;

generating a knock determining signal if it is determined that there is knocking in a cylinder;

calculating a deviation level corresponding to a knock determining signal based on a difference between a peak level of a knock sensor output signal for each cylinder and a predetermined peak threshold;

determining whether the deviation level is equal to a predetermined noise level and generating a noise determining signal if the deviation level is equal to the noise level;

determining whether the number of noise determining signals generated is less than a first predetermined value;

retarding an ignition instant of a cylinder if the deviation level for the cylinder is not equal to the noise level, or if the number of noise determining signals for the cylinder is less than the first predetermined value; and inhibiting ignition retarding control on the cylinder if the number of noise determining signals for the cylinder is greater than the first predetermined value.

The above and other objects, features and advantages of the present invention will become apparent from the following detailed description of a preferred embodiment of the invention taken in conjunction with the accompanying drawings.

DESCRIPTION OF THE PREFERRED EMBODIMENT

A preferred embodiment of the present invention will now be described in detail with reference to the accompanying drawings. In the following, the same or corresponding parts of this embodiment are identified by the same symbols as used in FIG. 4.

Figure 1:
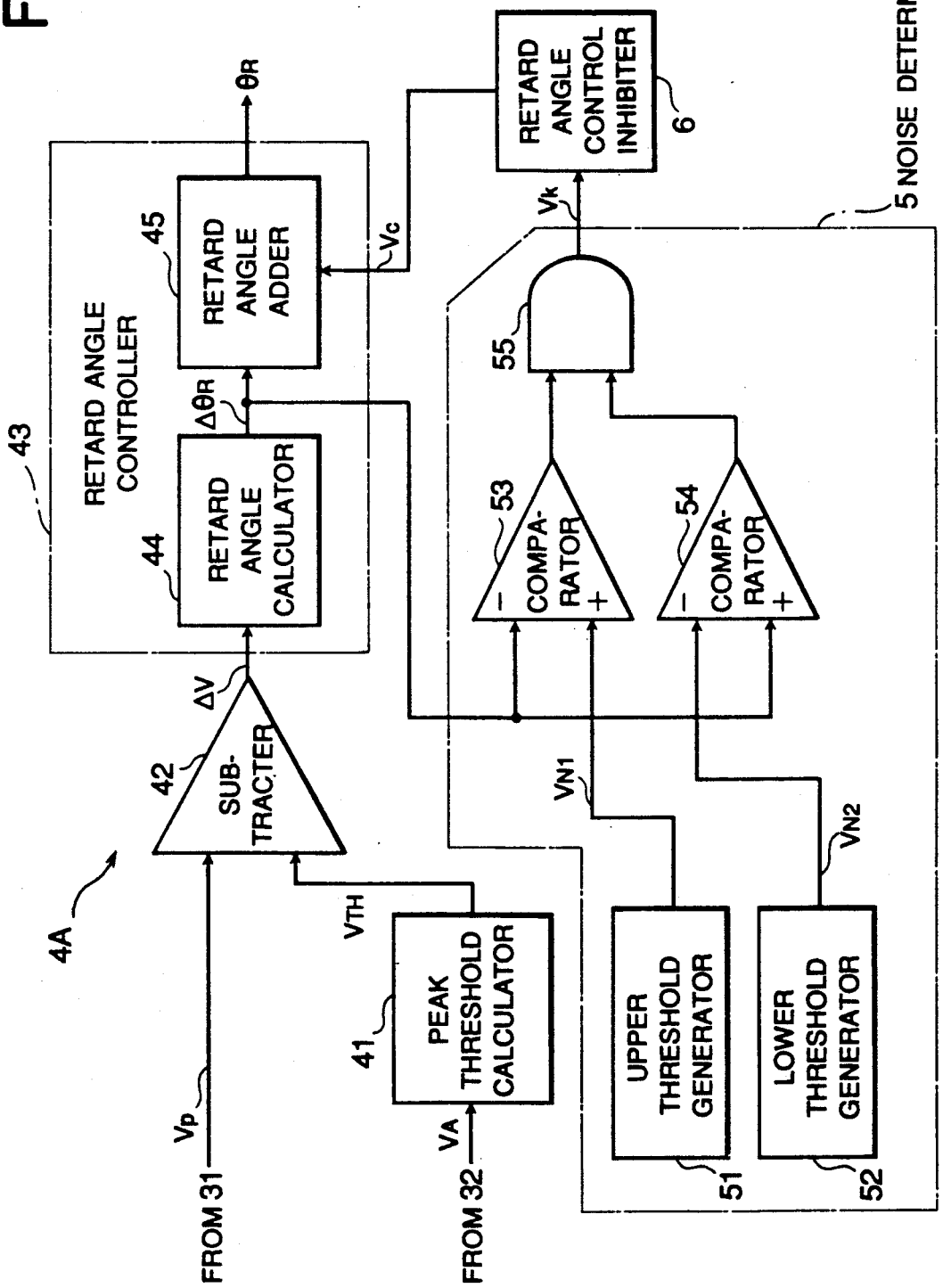
FIG. 1 is a schematic block diagram of a knock suppression apparatus for a multi-cylinder internal combustion engine in accordance with one embodiment of the present invention.

Referring to the drawings and first to FIG. 1, there is shown the general arrangement of a knock suppression apparatus for a multi-cylinder internal combustion engine constructed in accordance with the present invention. Although not illustrated, the knock suppression apparatus of FIG. 1 includes a knock sensor means comprising a plurality of knock sensors in the form of acceleration or vibration sensors, etc., each of which is installed on a corresponding cylinder, a knock interface circuit, and a first and second A/D converter, all of which are the same as the elements 1, 2, 31 and 32 of FIG. 4. In addition to these elements, the knock suppression apparatus of the invention includes an ECU 4A which comprises a noise determiner 5, a knock control inhibiter 6 in the form of a retard angle control inhibiter, a peak threshold calculator 41, a knock determiner 42 in the form of a substracter, and a controller 43 in the form of a retard angle controller, all of which will be described below in this order.

The noise determiner 5 operates to determine, based on the amount or angle of ignition retardation $\Delta\theta_R$ for each ignition, whether a deviation level $\Delta V$ in the form of a knock determining signal for each cylinder is erroneus due to noise, and it generates a noise determining signal Vk for a cylinder for which the deviation level is erroneous.

The noise determiner 5 includes an upper threshold generator 51 for generating an upper threshold $V_{N1}$, a lower threshold generator 52 for generating a lower threshold $V_{N2}$, a first comparator 53 for making a comparison between the amount or angle of retardation $\Delta\theta_R$ and the upper threshold $V_{N1}$, a second comparator 54 for making a comparison between the amount or angle of retardation $\Delta\theta_R$ and the lower threshold $V_{N2}$, and an AND gate 55 for generating a noise determining signal Vk if the output signals from the first and second comparators 53, 54 are both high.

The first comparator 53 generates a high-level output if $\Delta\theta_R \leq V_{N1}$, and the second comparator 54 generates a high-level output if $\Delta\theta_R \geq V_{N2}$. The AND gate 55 generates a noise determining signal Vk of a high level if $V_{N1} \geq \Delta\theta_R \geq V_{N2}$.

The retard angle control inhibiter 6 operates to generate a retard angle control inhibiting signal Vc for each cylinder based on the noise determining signal Vk. The retard angle control inhibiter 6 serves to inhibit a deviation level in the form of a knock determining signal $\Delta V$ from being reflected on ignition retarding control on a cylinder for which a noise determining signal Vk is issued.

The retard angle control inhibiter 6 includes a plurality of unillustrated counters for counting the number or times of ignitions for each cylinder as well as the number or times of noise determining signals Vk generated. The retard angle control inhibiting signal Vc is input to the retard angle adder 45 in the retard angle controller 43 for inhibiting calculation of the amount or angle of retardation $\Delta\theta_R$.

For example, the retard angle control inhibiter 6 includes a plurality of first counters each counting the noise determining signals Vk for a corresponding cylinder upon every ignition, and inhibits a deviation level $\Delta V$ from being reflected on the ignition retarding control on a cylinder for which the number of noise determining signals Vk generated exceeds a first predetermined value $n_1$.

The retard angle control inhibiter 6 also serves to inhibit a deviation level $\Delta V$ from being reflected on the ignition retarding control on a cylinder for which more than a predetermined number of noise determining signals Vk are successively generated.

Further, the retard angle control inhibiter 6 includes a plurality of second counters each counting the number of ignitions for a corresponding cylinder. The inhibiter 6 operates to clear a second counter for a cylinder whenever a noise determining signal Vk for the cylinder is generated, and clear a first counter for the cylinder if the number of ignitions of the cylinder at the time when the number of noise determining signals Vk generated for the cylinder exceeds a first predetermined value $n_1$ is greater than a second predetermined value $n_2$ which is much greater than the first predetermined value $n_1$.

Moreover, the retard angle control inhibiter 6 further includes a plurality of third counters each counting the number of ignitions of a corresponding cylinder. The inhibiter 6 operates to inhibit a deviation level $\Delta V$ from being reflected on ignition retarding control on a cylinder if the number of noise determining signals Vk generated for the cylinder exceeds a predetermined value such as $n_1$ within a predetermined number of ignitions thereof.

Figure 2:
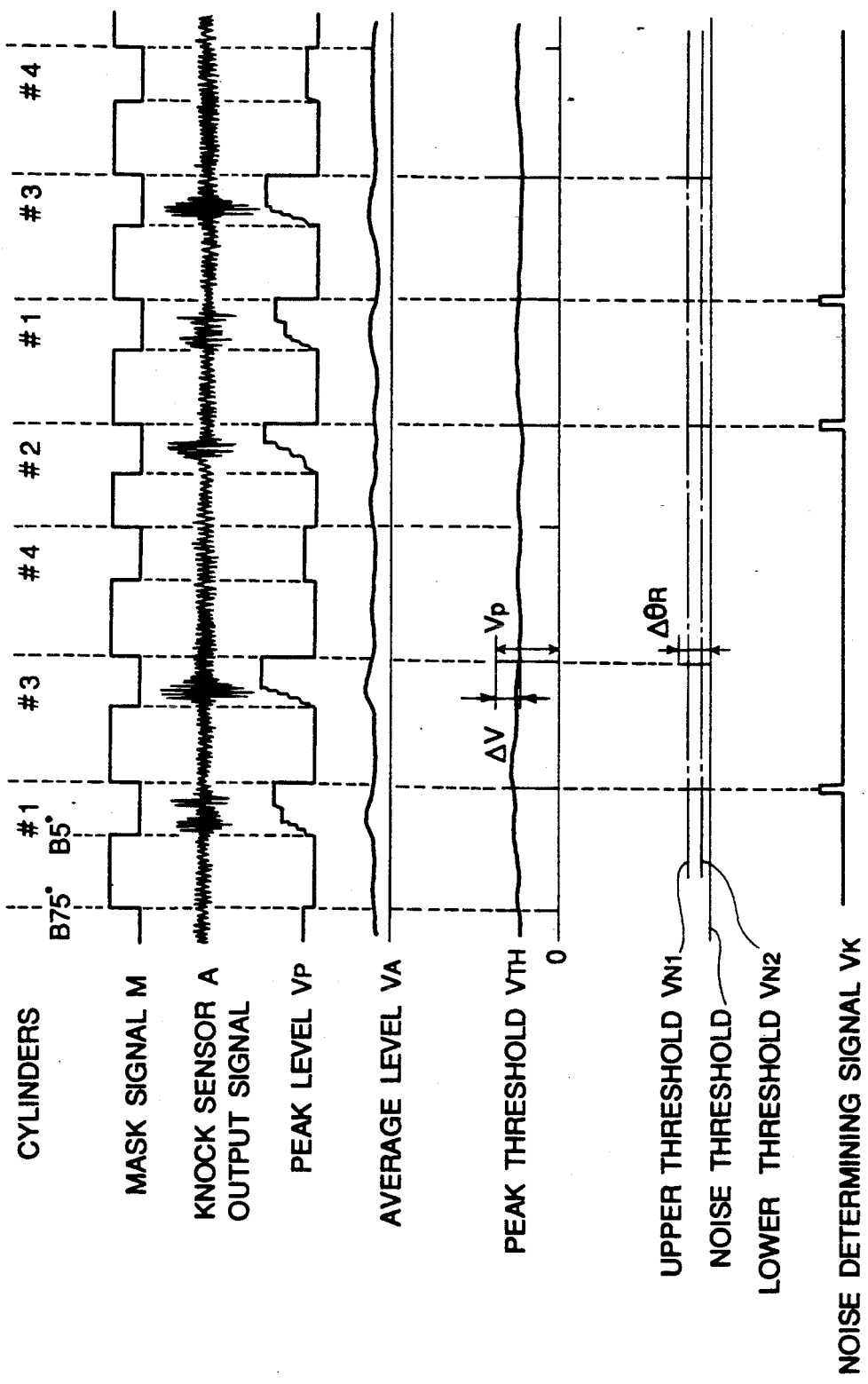
FIG. 2 is a waveform diagram showing the signal waveforms at various portions of the apparatuses of FIGS. 1 and 4 for explaining the operations thereof.

The operation of the above-described apparatus as well as a knock control method carried out thereby will now be described in detail while referring to FIG. 1 as well as the waveform diagram of FIG. 2 and the flow chart of FIG. 3.

In this connection, let us suppose that the upper threshold $V_{N1}$, the lower threshold $V_{N2}$, and the first and second predetermined values $n_1$, $n_2$ ($n_1 << n_2$) are initially set, and all the unillustrated counters in the retard angle control inhibiter 6 are all initially cleared.

The knock sensor means senses vibrations of respective cylinders and generates an output signal A for knock determination. As shown in FIG. 2, the output signal A thus generated comprises high-frequency pulses containing groups of peak pulses for the respective cylinders #1, #2, #3 and #4 which periodically appear in the order of combustion or ignition. As clearly seen from FIG. 2, in this example, noise pulses are usually generated for specific cylinders #1 and #2, and the peak levels of such noise pulses are substantially constant at all times and less than the peak levels due to knocking.

Figure 4:
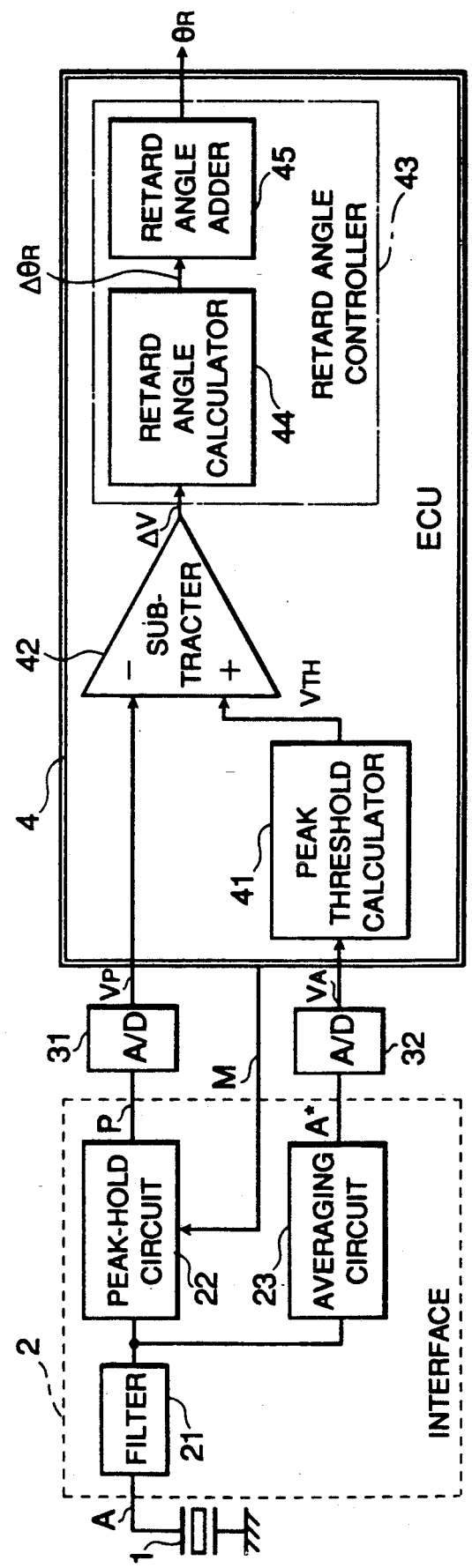
FIG. 4 is a schematic block diagram of a known knock suppression apparatus for an internal combustion engine.

The interface circuit generates a peak level P and an average level A* upon every ignition of each cylinder, as previously described in detail with reference to FIG. 4, and the ECU 4A receives an analog-to-digital converted peak level $V_P$ and a similarly converted average level $V_A$. In this regard, the peak level $V_P$ is sampled at a first reference crank position of 75 degrees before top dead center for each cylinder, for example.

First, in Step S1, the ECU 4A determines from which cylinder the peak level $V_P$ and the average level $V_A$ came. If it is determined that they came from the Nth cylinder, a routine corresponding to that cylinder is performed. In this connection, it is to be understood that the retard angle control routine as shown in FIG. 3 is carried out for each cylinder.

Then in Step S2, the subtracter 42 in the ECU 4A subtracts a peak threshold $V_{TH}$ from the peak level $V_P$ as follows:

$$\Delta V = V_P - V_{TH}$$

In Step S3, the retard angle controller 43 determines whether the deviation level $\Delta V$ is greater than zero.

If $\Delta V > 0$, then in Step S4, the retard angle calculator 44 calculates the amount or angle of retardation $\Delta \theta_R$ for each ignition based on a deviation level $\Delta V$ using the following equation in order to make the deviation reflected in retarding the ignition instant of the Nth cylinder:

$$\Delta \theta_R = L' \times \Delta V / V_{TH}$$

where L' is the rate of reflection. In this case, since the amount of retardation $\Delta \theta_R$ is normalized by the peak threshold $V_{TH}$, an appropriate amount of retardation $\Delta \theta_R$ can always be obtained even if there is a variation in the peak level $V_P$ and/or the deviation level $\Delta V$.

On the other hand, in Step S5, the first comparator 53 in the noise determiner 5 compares the amount of retardation $\Delta \theta_R$ with the upper noise threshold $V_{N1}$, and determines whether $\Delta \theta_R \leq V_{N1}$. Also, in Step S6, the second comparator 54 compares the amount of retardation $\Delta \theta_R$ with the lower noise threshold $V_{N2}$, and determines whether $\Delta \theta_R \geq V_{N2}$.

In general, the noise level contained in the peak level $V_P$ is less than a knock determining level in the form of the upper noise threshold $V_{N1}$ and greater than a predetermined level in the form of the lower noise threshold $V_{N2}$. Here, use of the amount of retardation $\Delta \theta_R$ normalized by the peak threshold $V_{TH}$ enables highly reliable noise determination.

The first comparator 53 generates an output signal of a high level if $\Delta \theta_R \leq V_{N1}$, and the second comparator 54 generates an output signal of a high level if $\Delta \theta_R \leq V_{N2}$. As a result, the AND gate 55 generates a noise determining signal Vk of a high level to the retard angle control inhibiter 6 if $V_{N1} \leq \Delta \theta R \leq V_{N2}$.

In Step S7, the retard angle control inhibiter 6 reads a first counter for a cylinder and compares the counted number or reading of the first counter $CN_1$ with a first predetermined value $n_1$ (e.g., several times or 2-5) to determine $CN_1 < n_1$.

If $CN_1 < n_1$, then in Step S8, the first counter is incremented; the number of noise determining signals Vk generated is computed; and a second counter for counting the number of normal ignitions for the cylinder is cleared.

At this time, the retard angle control inhibiter 6 generates no retard angle control inhibiting signal Vc, so the amount of retardation $\Delta \theta_R$ based on the deviation level $\Delta V$ is reflected on a retarded control angle $\theta_R$. In other words, even if the deviation level $\Delta V$ is determined to be equal to a noise level, ignition retarding control is not inhibited when the number of noise determining signals Vk does not yet reach the predetermined value $n_1$. This is because in the early period of ignition counting, it is difficult to determine whether the deviation level $\Delta V$ is due to noise or actual knocking, and hence it is on the safe side to take the deviation level $\Delta V$ as due to knocking. Generally, if the peak level $V_P$ results from knocking, the peak level $V_P$ after ignition retarding control has been performed is suppressed. Accordingly, it is concluded without fail that noise determining signals Vk successively generated until they reach the first predetermined value $n_1$ indicate incorrect or erroneous knock determination due to noise.

Subsequently, in Step S9, the second counter is incremented, and thereafter in Step S10, the retard angle adder 45 calculates a retarded control angle $\theta_R$ using the following formula:

$$\theta_R = \theta_R^* + \Delta \theta_R$$

On the other hand, if $\Delta V \leq 0$ in Step S3, then in Step S11, the amount of retardation $\Delta \theta_R$ is set to zero, and in Step 12, the first counter is cleared. Thereafter, in Step S9, the second counter is incremented.

Further, if it is determined that $\Delta \theta_R > V_{N1}$ in Step S5 or $V_{N2} > \Delta \theta_R > 0$ in Step S6, then in Step S12, the first counter is cleared and in Step S9, the second counter is incremented. Subsequently, in Step S10, the retarded control angle $\theta_R$ is calculated so that ignition retarding control based on the deviation level $\Delta V$ is carried out.

In this case, the first counter, which is cleared in Step S12, never reaches the first predetermined value $n_1$, allowing ignition retarding control to be performed based on the amount of retardation $\Delta\theta_R$ as long as the number of noise determining signals Vk consecutively generated exceeds the first predetermined value $n_1$.

On the contrary, if a number of noise determining signals Vk more than the first predetermined value $n_1$ are consecutively generated so that it is determined $CN_1 \geq n_1$ in Step S7, the retard angle control inhibiter 6 generates a retard angle control inhibiting signal Vc to the retard angle adder 45 and performs the following Steps S21–S24.

First, in Step S21, the retard angle control inhibiter 6 reads the second counter and compares the reading of the second counter $CN_2$ with the second predetermined value n2 (e.g., 100–200) to determine $CN_2 < n_2$.

If the reading of the second counter $CN_2$ is less than the second predetermined value $n_2$, then in Step S22, the first counter is clipped to the first predetermined value $n_1$, and the second counter is cleared. In Step S23, the amount of retardation $\Delta\theta_R$ is set to zero and then the program goes to Step S9. On the other hand, if it is determined $CN_2 \geq n_2$ in Step S21, then in Step S24, the first counter is cleared and in Step S23, the amount of retardation $\Delta\theta_R$ is set to zero.

According to the clipping of the first counter in Step S22, when a noise determining signal Vk is generated immediately after Step S22, the program proceeds from Step S7 to Step S21. As a result, ignition retarding control continues to be inhibited until the number of ignition-retarding-control inhibiting Steps S23 successively carried out exceeds the second predetermined value $n_2$. When the number of Steps S23 successively performed reaches the second predetermined value $n_2$, the first counter is reset in Step S24, and the program proceeds from Step S7 to Step S8 with the result that Steps S21–S24 are no longer performed. At the same time, in Step S8, the second counter is also reset.

In general, the generation of noise in the engine ceases after the lapse of a certain predetermined period, so there will be no problem if the first and second counters are reset at the time when ignition-retarding-control inhibiting operations have been performed over the second predetermined number of times $n_2$.

Figure 3:
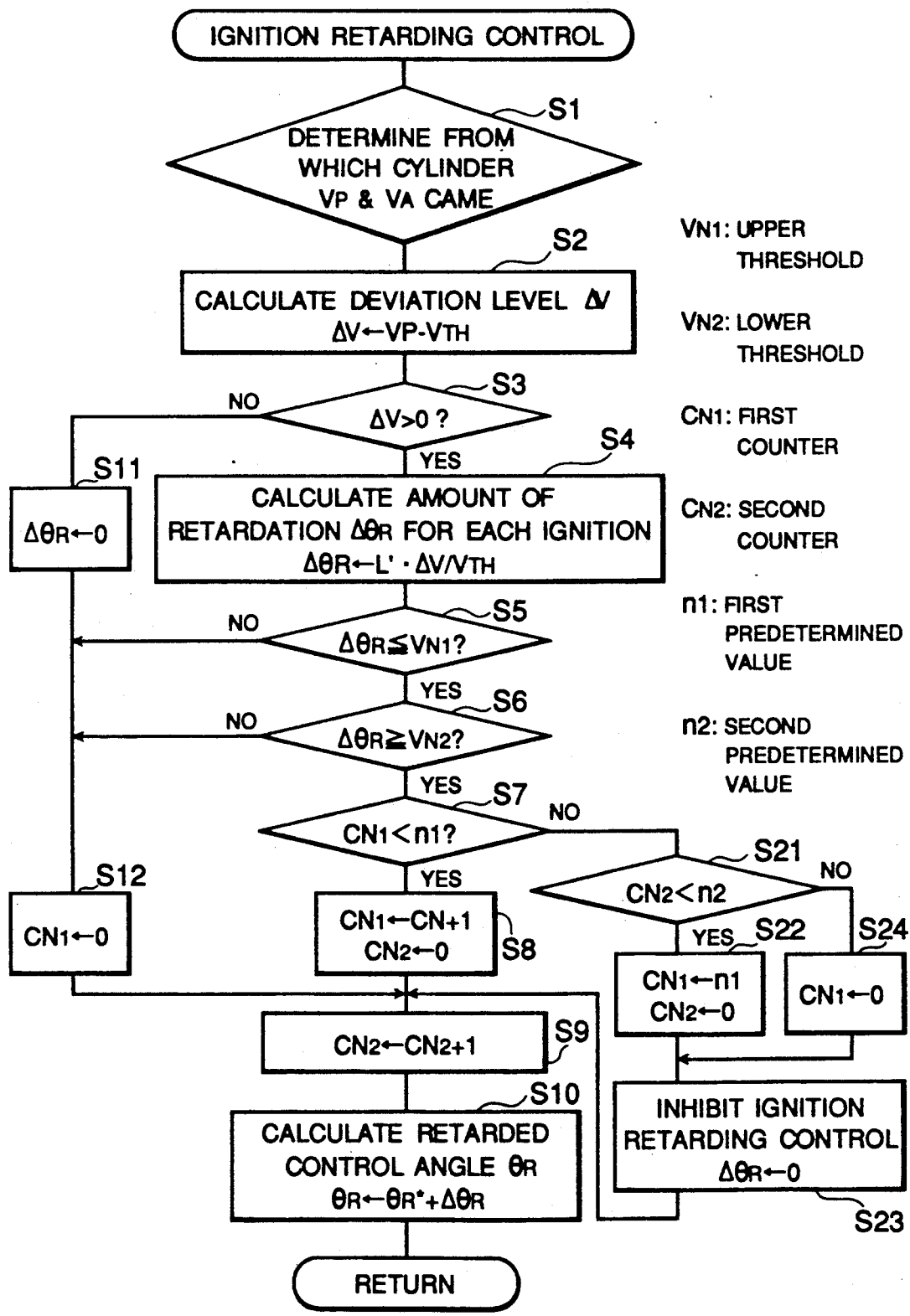
FIG. 3 is a flow chart showing the operating process of the apparatus of FIG. 1.

In this manner, the retard angle control routine as shown in FIG. 3 is repeated every time ignition takes place. Since this routine is independently carried out for the respective cylinders, even if one cylinder is subject to ignition retarding control, the remaining cylinders are not simultaneously subject to such control. Further, in the early period of the start of ignition or in the early period of generating noise determining signals Vk, ignition retarding control is performed without fail with respect to a peak level $V_P$ which exceeds the peak threshold $V_{TH}$, whereas ignition retarding control is inhibited when the number of noise determining signals Vk consecutively generated reaches the first predetermined value $n_1$.

Although in the above-described embodiment, retard angle control or ignition retarding control for a cylinder is inhibited when the number of consecutively generated noise determining signals Vk for the cylinder reaches the first predetermined value $n_1$, Step S21 can be omitted and ignition retarding control for a cylinder can be inhibited when the total number of noise determining signals Vk for the cylinder reaches the first predetermined value $n_1$. In this case, the retard angle control inhibiter 6 includes a plurality of third counters each counting the number of ignitions of a corresponding cylinder, and it operates to inhibit ignition retarding control on a cylinder for which the number of noise determining signals Vk generated within a prescribed number of ignitions of the cylinder exceeds the first predetermined value $n_1$.

In addition, although in the above embodiment, for the purpose of determining whether a deviation level $\Delta V$ is erroneous due to noise, two comparators 53, 54 are employed for comparing a deviation level $\Delta V$ with the upper and lower thresholds in Steps S5 and S6, the second comparator 54 can be omitted whereupon the noise determiner 5 generates a noise determining signal Vk if the amount of retardation $\Delta\theta_R$ is less than the upper threshold $V_{N1}$.

What is claimed is:

1. A knock suppression apparatus for a multi-cylinder internal combustion engine, comprising:
   a) knock sensor means for sensing vibrations of cylinders to generate a corresponding output signal;
   b) a knock determiner for generating a knock determining signal if it is determined, based on the output signal of said knock sensor means, that a peak level thereof exceeds a peak threshold derived from an average level thereof;
   c) a controller for controlling engine operating parameters in a direction to suppress knocking in the cylinder based on the knock determining signal;
   d) a noise determiner for determining whether the knock determining signal for each cylinder is erroneous due to noise, and for generating a noise determining signal if the knock determining signal is erroneous; and
   e) a knock control inhibiter for inhibiting knock suppression control by the controller based on the knock determining signal on a cylinder for which a noise determining signal is generated.

2. A knock suppression apparatus according to claim 1, wherein said controller comprises an ignition retarding controller for retarding an ignition instant of a knocking cylinder in response to a knock determining signal for the cylinder.

3. A knock suppression apparatus according to claim 1, wherein said knock control inhibiter includes a plurality of first counters each counting noise determining signals for a corresponding cylinder, and inhibits knock suppression control on a cylinder for which more than a first predetermined number of noise determining signals are generated.

4. A knock suppression apparatus according to claim 1, wherein said knock control inhibiter inhibits knock suppression control on a cylinder for which more than a predetermined number of noise determining signals are consecutively generated.

5. A knock suppression apparatus according to claim 3 wherein said knock control inhibiter further includes a plurality of second counters each counting the number of ignitions of a corresponding cylinder, said knock control inhibiter being operable to clear a second counter for a cylinder each time a noise determining signal for the cylinder is generated, and clear a first counter for the cylinder if the number of ignitions of the cylinder is more than a second predetermined value at the time when the number of noise determining signals generated for the cylinder exceeds a first predetermined value.

6. A knock suppression apparatus according to claim 1, wherein said knock control inhibiter includes a plurality of counters each counting the number of ignitions of a corresponding cylinder, said knock control inhibiter being operable to inhibit knock suppression control on a cylinder for which the number of noise determining signals generated within a predetermined number of ignitions of the cylinder exceeds a predetermined value.

7. A knock suppression method for a multi-cylinder internal combustion engine, comprising the steps of:
   a) sensing vibrations of cylinders to generate a corresponding knock sensor output signal;
   b) generating a knock determining signal if it is determined, based on the knock sensor output signal, that a peak level thereof exceeds a peak threshold derived from an average level thereof;
   c) controlling engine operating parameters in a direction to suppress knocking in the cylinder based on the knock determining signal;
   d) determining whether the knock determining signal for the cylinder is erroneous due to noise;
   e) generating a noise determining signal if the knock determining signal is erroneous; and
   f) inhibiting knock suppression control based on the knock determining signal on a cylinder for which a noise determining signal is generated.

8. A knock suppression method according to claim 7, wherein the step of inhibiting knock suppression control comprises inhibiting ignition retarding control on a cylinder for which more than a first predetermined number of noise determining signals are generated.

9. A knock suppression method according to claim 7, wherein the step of inhibiting knock suppression control comprises inhibiting ignition retarding control on a cylinder for which more than a predetermined number of noise determining signals are consecutively generated.

10. A knock suppression method according to claim 7, wherein the step of inhibiting knock suppression control comprises inhibiting ignition retarding control on a cylinder for which the number of noise determining signals generated within a predetermined number of ignitions of the cylinder exceeds a first predetermined value.

11. A knock control method for a multi-cylinder internal combustion engine comprising the steps of:
    sensing vibrations of cylinders to generate a correspondng knock sensor output signal;
    determining, based on the knock sensor output signal, whether there is knocking in a cylinder;
    generating a knock determining signal if it is determined that there is knocking in a cylinder;
    calculating a deviation level corresponding to a knock determining signal based on a difference between a peak level of a knock sensor output signal for each cylinder and a predetermined peak threshold;
    determining whether the deviation level is equal to a predetermined noise level and generating a noise determining signal if the deviation level is equal to the noise level;
    determining whether the number of noise determining signals generated is less than a first predetermined value;
    retarding an ignition instant of a cylinder if the deviation level for the cylinder is not equal to the noise level; and
    inhibiting ignition retarding control on the cylinder if the number of noise determining signals for the cylinder is greater than the first predetermined value.

12. A knock control method for a multi-cylinder internal combustion engine comprising the steps of:
    sensing vibrations of cylinders to generate a corresponding knock sensor output signal;
    determining, based on the knock sensor output signal, whether there is knocking in a cylinder;
    generating a knock determining signal if it is determined that there is knocking in a cylinder;
    calculating a deviation level corresponding to a knock determining signal based on a difference between a peak level of a knock sensor output signal for each cylinder and a predetermined peak threshold;
    determining whether the deviation level is equal to a predetermined noise level and generating a noise determining signal if the deviation level is equal to the noise level;
    determining whether the number of noise determining signals generated is less than a first predetermined value;
    retarding an ignition instant of a cylinder if the number of noise determining signals for the cylinder is less than the first predetermined value; and
    inhibiting ignition retarding control on the cylinder if the number of noise determining signals for the cylinder is greater than the first predetermined value.

* * * * *